UNITED STATES PATENT OFFICE.

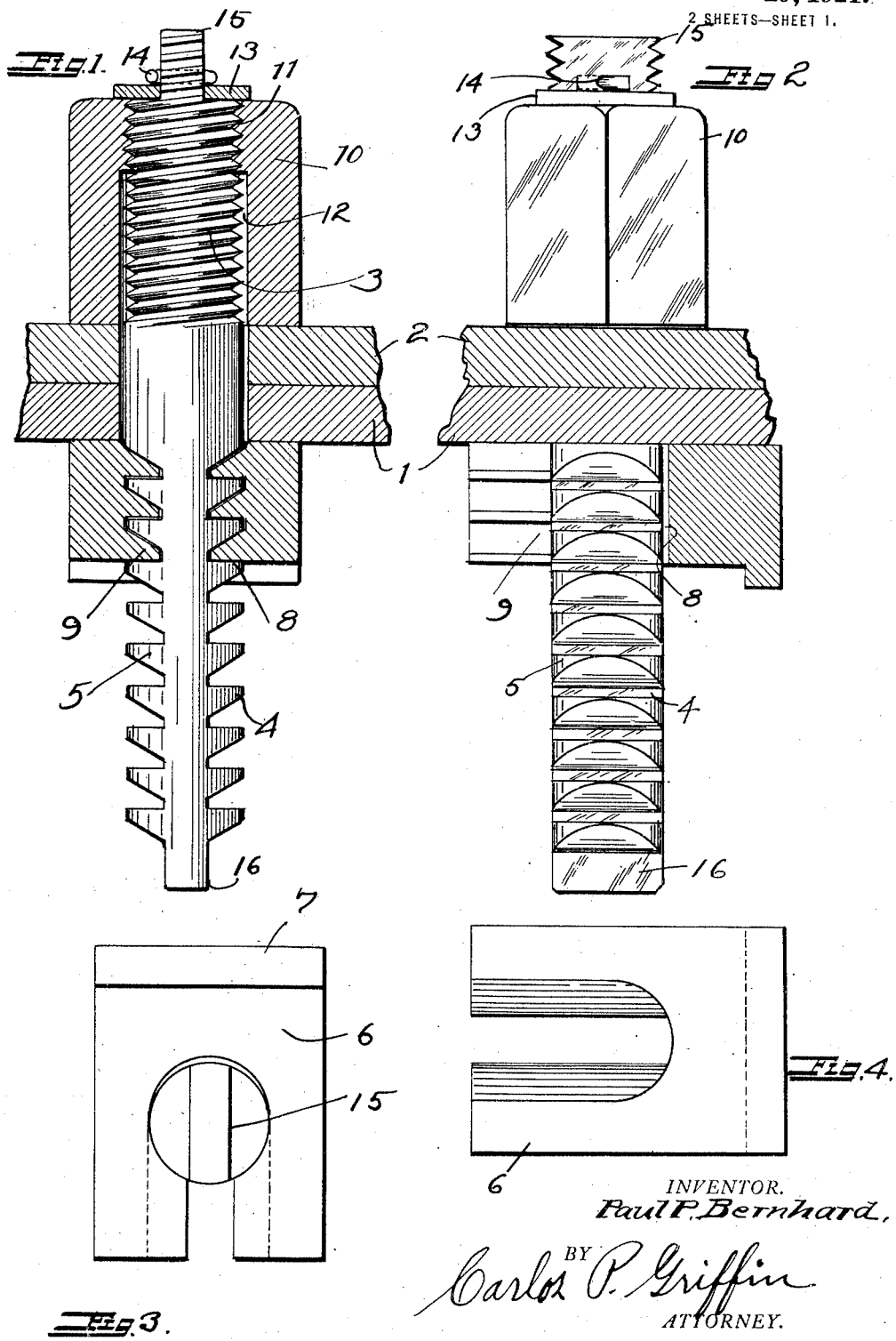

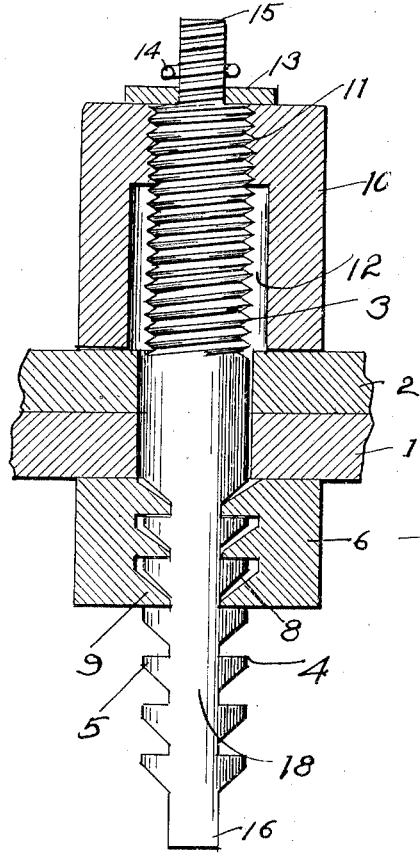
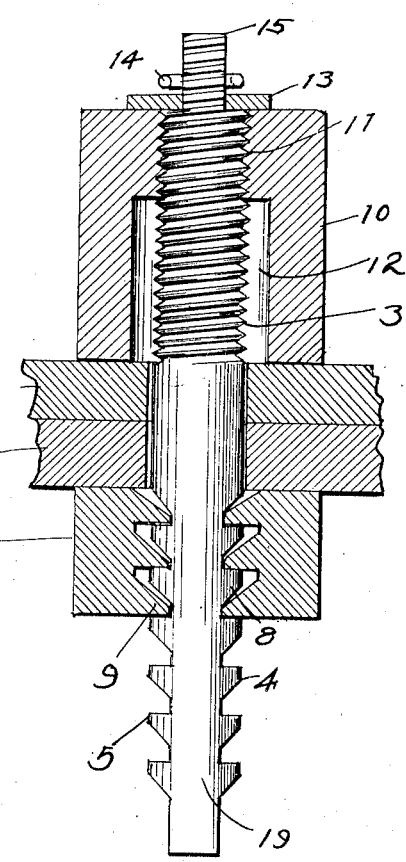

PAUL P. BERNHARD, OF ALAMEDA, CALIFORNIA.

STRUCTURAL BOLT.

1,373,045. Specification of Letters Patent. Patented Mar. 29, 1921.

Application filed April 14, 1920. Serial No. 373,877.

*To all whom it may concern:*

Be it known that I, PAUL P. BERNHARD, a citizen of the United States, residing at Alameda, in the county of Alameda, State of California, have invented a new and useful Structural Bolt, of which the following is a specification, in such full and clear terms as will enable those skilled in the art to construct and use the same.

This invention relates to a structural bolt used for the purpose of temporarily connecting up ship, bridge and building plates prior to riveting and its object is to enable a single lock to be used on a number of different size bolts and to allow a single spanner to be used for tightening the nuts on all of the different size bolts.

It will be understood by those skilled in the art that in structural iron and steel work, it is necessary to bolt up the plates into position prior to riveting them permanently in place, and these bolts must have a nut and several washers applied thereto to effect the desired object.

Where a permanent head is used on the bolt, the nut must be removed from the bolt and therefore it is quite difficult to assemble the nut and bolt after the bolts have been thrown around in a keg or the threads marred. In the present case the threaded nut is allowed to remain permanently on the bolt and is of the same exterior dimensions regardless of the size of bolt used within certain limits.

The locking head is completely detachable therefrom to permit the bolt to be inserted in the bolt hole and the locking head can be released from the bolt by simply loosening the nut and removing the locking head with the fingers or with a tap of a hammer, if it happens to be tight.

Another object of the invention is to provide means on the nut end of the bolt for holding the bolt from turning when the nut is being tightened, and to provide means to prevent the removal of the nut accidentally, although it may be removed from the bolt completely should that become necessary.

Another object of the invention is to provide a bolt nut which will dispense with the use of washers in tightening the bolt on the plates and which will at the same time protect the threads of the bolt against injury when the bolt is in use, so that the nut will always work freely on the bolt.

Other objects of the invention will appear as the description proceeds.

An embodiment of the invention is shown in the accompanying drawings in which the same reference numeral is applied to the same portion throughout, but I am aware that there may be modifications thereof.

Figure 1 is a side elevation of one of the large bolts, the locking head and nut being shown in section.

Fig. 2 is a side elevation of the bolt shown in Fig. 1, looking at right angles to Fig. 1 and showing the locking head in vertical section.

Fig. 3 is a bottom plan view of the bolt with the locking head in place thereon, the nut being removed.

Fig. 4 is a plan view of the locking head.

Fig. 5 is a side elevation of a $\frac{1}{4}$ inch bolt with the nut and locking head being shown in section.

Fig. 6 is a side elevation of a $\frac{3}{4}$ inch bolt with the locking head and nut being shown in section.

The numerals 1 and 2 indicate two plates to be secured together by the bolt. The bolt has a threaded portion 3 and on the other end is provided with a plurality of oppositely placed wings 4 and 5 forming notches which give the bolt a saw-like appearance when viewed in one plane.

The bolt head or lock comprises an open slotted member 6, with a rib 7, said slot being provided along one end and side with three series of wings 8 and 9 which match the notches formed on the bolt. The nut 10 is provided with threads 11 adjacent one end and it is large enough to pass over the threads of the bolt for the production of a chamber as indicated at 12, the object being to dispense with the use of washers in tightening up the bolt on the plates to which it is applied. A washer 13, held in place by means of a wire ring 14, prevents the accidental removal of the nut from the bolt.

In order to provide means for holding the bolt, each nut is provided with a flattened portion as indicated at 15 and 16, so that the bolt may be prevented from turning by the application of a suitable wrench to either end when being tightened.

It will be observed that the bolts shown in Figs. 5 and 6 are of different sizes from the bolt shown in the previous figures. In these figures a ⅝ inch bolt is indicated at 18 and a ¾ inch bolt is indicated at 19, but in each of these figures, the same lock 6 and the same nut 10 is applied to the bolt to secure it in place, the only difference being that the size of the opening in the threaded portion of the nuts is of suitable size to take the threads of its bolt, while the locks 6 are of the same size as those described in connection with the other bolt. The only difference is that the wings of the bolt do not fill the space in the lock so fully as they do in Figs. 1 and 2. The reason for this lies in the fact that it is more expeditious to use a single size spanner to turn the nuts on all of the bolts, say from ¾ to 1¼ inch, and to provide locks all of the same size thereby enabling one lock to be used in connection with all of the different size bolts, so that no time would be lost in picking up or endeavoring to use a lock of the wrong size and no time is lost in attempting to place a nut on a bolt that has its threads burred or injured.

What I claim is as follows, but various modifications may be made in the construction shown in the drawings and above particularly described form, within the purview of my invention.

1. A bolt for structural iron work comprising a bolt having a series of notches on two sides, a head adapted to slidably engage any of said notches for the preliminary adjustment of the bolt, and a screw nut on the bolt for tightening the bolt against plates through which it may be passed.

2. A bolt for structural iron work comprising a bolt having a plurality of V-shaped notches on opposite sides, a lock adapted to engage said notches for holding the bolt, a flat head on each end of the bolt for the application of a wrench to prevent it from rotating, a threaded nut on the bolt and means to prevent the accidental removal of the nut from the bolt.

In testimony whereof I have hereunto set my hand this 3" day of April, A. D. 1920.

PAUL P. BERNHARD.